(12) United States Patent
Okada

(10) Patent No.: US 8,562,199 B2
(45) Date of Patent: Oct. 22, 2013

(54) LIGHTING DEVICE

(75) Inventor: Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 164 days.

(21) Appl. No.: 13/290,050

(22) Filed: Nov. 4, 2011

(65) Prior Publication Data

US 2012/0147591 A1 Jun. 14, 2012

(30) Foreign Application Priority Data

Nov. 4, 2010 (JP) ................................. 2010-247577

(51) Int. Cl.
*F21V 7/10* (2006.01)

(52) U.S. Cl.
USPC .......................................... 362/628; 362/299

(58) Field of Classification Search
USPC .................. 362/299, 612, 628, 309
See application file for complete search history.

(56) References Cited

U.S. PATENT DOCUMENTS

| | | | |
|---|---|---|---|
| 6,679,621 B2 | 1/2004 | West et al. | |
| 7,059,731 B2 | 6/2006 | Lee et al. | |
| 7,290,906 B2 * | 11/2007 | Suzuki et al. | 362/511 |
| 7,322,729 B2 | 1/2008 | Nagabuchi | |
| 2012/0188774 A1 * | 7/2012 | Okada | 362/299 |
| 2012/0218772 A1 * | 8/2012 | Mitsuhashi et al. | 362/516 |

FOREIGN PATENT DOCUMENTS

| | | |
|---|---|---|
| JP | 2003-317508 A | 11/2003 |
| JP | 4458359 B2 | 4/2010 |

* cited by examiner

*Primary Examiner* — Nimeshkumar Patel
*Assistant Examiner* — Christopher Raabe
(74) *Attorney, Agent, or Firm* — Kenealy Vaidya LLP

(57) ABSTRACT

A lighting device can include an LED and a plate-like lens body including a narrow side surface configured as an elongated rectangular light exiting surface. The LED can face towards the lens body so that light emitted in a wide angle direction is directed to the front surface and the rear surface in the thickness direction and so that light in a narrow angle direction can impinge on the second side surface of the lens body to enter the lens body. The lens body can include a first optical system having a lens portion, a first light incident surface, a first total reflection surface, and a second total reflection surface. A second optical system can include a second light incident surface, a third total reflection surface, and a fourth total reflection surface. An air layer can be provided between the lens portion and the first light incident surface.

18 Claims, 7 Drawing Sheets

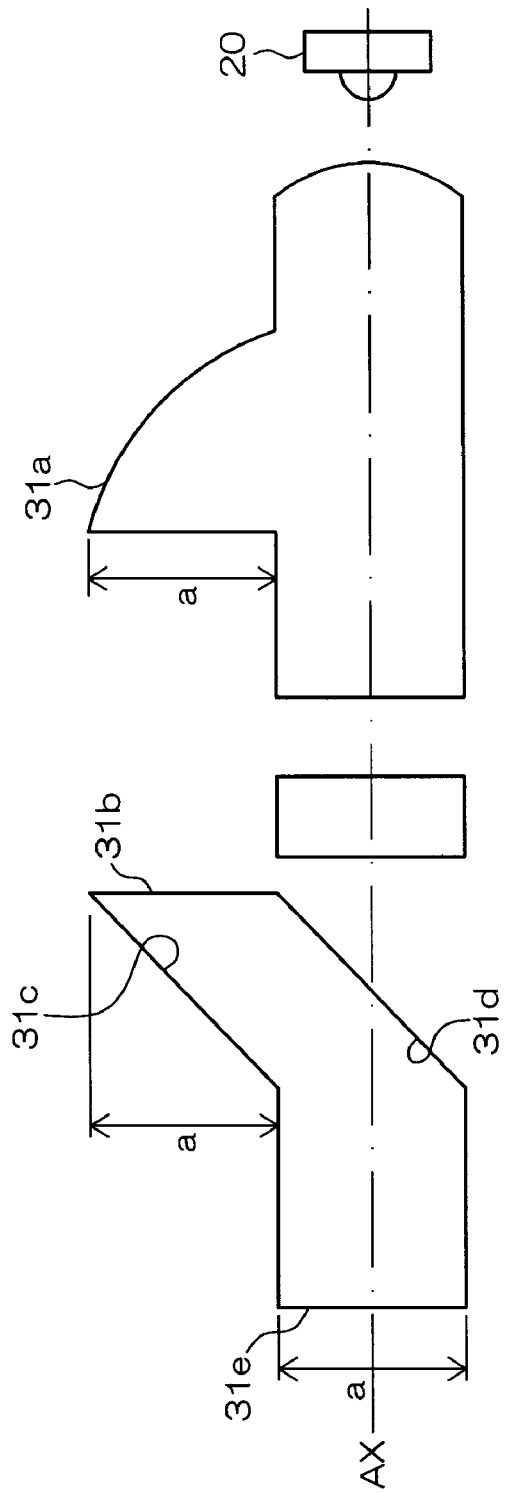

LIGHTING DEVICE

This application claims the priority benefit under 35 U.S.C. §119 of Japanese Patent Application No. 2010-247577 filed on Nov. 4, 2010, which is hereby incorporated in its entirety by reference.

TECHNICAL FIELD

The presently disclosed subject matter relates to a lighting device that can utilize a semiconductor light source, such as an LED light source, and a plate-like lens body in combination.

BACKGROUND ART

Japanese Patent No. 4458359 (U.S. Pat. No. 7,322,729) has proposed, among other embodiments, a conventional lighting device utilizing an LED light source and a lens body.

As shown in FIGS. 1A to 1C, one embodiment disclosed in the conventional art patent document can be formed as lighting device 200 and can include a plate-like lens body 210 and an LED light source 220 disposed in front of the surface of the lens body 210. The lens body 210 can include a first side surface 211 with a width dimension longer than a thickness dimension and serving as an elongated rectangular light exiting surface, and a second side surface 211 opposite to the first side surface 211.

In the lighting device 200 with the above configuration, the action of the lens body 210 having optical elements with refracting or reflecting action can cause the first side surface 211 to radiate light in a linear shape, thereby constituting a line-shaped light source. However, since the optical axis AX1 of the lens body 210 and the optical axis AX2 of the LED light source 220 are orthogonal to each other in this embodiment (see FIG. 1B), it is difficult to design the lamp layout.

To cope with this problem, as shown in FIG. 2, the LED light source 220 can be disposed so as not to face the main surface of the lens body 210, but to face the side surface of the lens body 210, thereby achieving the line-shape light source for emitting light in a linear shape.

In this case, in order to increase the utilization efficiency of light radially emitted from the LED light source 220, the area of the light incident surface may be increased. However, the lens thickness H of the lens body 210 must be increased in this case, requiring a thick molding for the lens body 210. This may increase the weight of what should otherwise be a lightweight lighting device 210.

SUMMARY

The presently disclosed subject matter was devised in view of these and other characteristics, problems and features and in association with the conventional art. According to an aspect of the presently disclosed subject matter, a lighting device can utilize a lens body having a thickness that is thinner than the conventional thickness and can achieve light utilization efficiency equal to or higher than that of the conventional light.

According to another aspect of the presently disclosed subject matter, a lighting device can include an LED light source having an optical axis, and a plate-like lens body including a front surface, a rear surface, a first side surface with a width dimension longer than a thickness dimension and serving as an elongated rectangular light exiting surface, and a second side surface opposite to the first side surface. The LED light source can be disposed to face to the second side surface of the lens body so that light travelling in the thickness direction of the lens body out of light radially emitted from the LED light source in a wide angle direction with respect to the optical axis is directed to the front surface and the rear surface of the lens body and so that light radially emitted from the LED light source in a narrow angle direction with respect to the optical axis can impinge on the second side surface of the lens body to enter the lens body. The lens body can include at least a first optical system and a second optical system. The first optical system can include: a lens portion that can be formed on the front surface and/or the rear surface of the lens body so as to allow the light toward the front surface and/or the rear surface of the lens body to impinge thereon to gather the light near the optical axis; a first light incident surface disposed on an optical path of the light gathered by the lens portion, the first light incident surface configured to cause the light to enter the lens portion again; a first total reflection surface disposed on an optical path of the light entering the lens body through the first light incident surface, the first total reflection surface configured to totally reflect the light in a direction orthogonal to the optical axis; and a second total reflection surface disposed on an optical path of the light totally reflected by the first total reflection surface, the second total reflection surface configured to totally reflect the light to project the light substantially parallel to the optical axis from an approximately center area of the first side surface as the light exiting surface. The second optical system can include: a second light incident surface disposed in the second side surface of the lens body facing to the LED light source, the second light incident surface configured to gather, toward the optical axis, the light radially emitted from the light source in the narrow angle direction with respect to the optical axis; a third total reflection surface disposed on an optical path of the light entering the lens body by being gathered by the second light incident surface, the third total reflection surface configured to totally reflect the light sideward with respect to the optical axis; and a fourth total reflection surface disposed on an optical path of the light totally reflected by the third total reflection surface, the fourth total reflection surface configured to totally reflect the light to project the light substantially parallel to the optical axis from a side area adjacent to the approximately center area of the first side surface as the light exiting surface. In this configuration, an air layer configured to cause the light gathered by the lens portion to pass therethrough can be provided between the lens portion and the first light incident surface.

According to the first aspect of the presently disclosed subject matter, even if the amount of light directed to the front surface and the rear surface of the lens body (see FIG. 2, being the light that does not enter the lens body in the conventional device) is increased by the thinning of the lens body thickness, the light directed to the front surface and the rear surface of the lens body can be caused to enter the lens body again by the action of the first optical system (such as the lens portion). It can prevent the light utilization efficiency from being lowered due to the thinning of the lens body thickness. Accordingly, it is possible to provide a lighting device that can utilize a lens body having a thickness thinner than the conventional light and can achieve the light utilization efficiency equal to or higher than that of the conventional light.

Furthermore, the action of the lens body (including the respective optical systems) can constitute the line-shaped light source configured to radiate light from the light exiting surface (the center area and the side area) in a line shape.

In addition, since the air layer is formed between the lens portion and the light incident surface, the lens body can be reduced in thickness by that amount (corresponding to the air layer) thus achieving a lightweight characteristic.

With the lighting device having the above configuration, a line-shaped light source configured to radiate light substantially parallel to the optical axis can be provided.

In the lighting device having the above configuration, the respective optical elements including the lens portion, the respective light incident surfaces and the respective total reflection surfaces can be adjusted to achieve a line-shaped light source having uniform brightness.

In the above configuration, the total reflection surfaces can reflect by 100% reflectance, and accordingly, the light utilization efficiency can be further improved when compared with the case of a reflection surface subjected to mirror finishing such as aluminum deposition.

In the above configuration, since the optical axis of the LED light source coincides with the optical axis of the lens body, the layout can be facilitated.

In the lighting device with the above configuration, the lens body can further include a third optical system. The third optical system can include: a third light incident surface configured to cause the light in the width direction of the lens body out of the light radially emitted from the LED light source in the wide angle direction with respect to the optical axis to enter the lens body; and a fifth total reflection surface configured to totally reflect the light entering the lens body through the third light incident surface so as to project the light substantially parallel to the optical axis from an outer area adjacent to the side area of the first side surface as the light exiting surface.

In the above lighting device, the action of the lens body (including the respective optical systems) can constitute the line-shaped light source configured to radiate light from the light exiting surface (the center area, the side area and the outer area) in a line shape.

Accordingly, it is possible to provide a lighting device that can utilize a lens body having a thickness thinner than the conventional light and can achieve the light utilization efficiency equal to or higher than that of the conventional light.

BRIEF DESCRIPTION OF DRAWINGS

These and other characteristics, features, and advantages of the presently disclosed subject matter will become clear from the following description with reference to the accompanying drawings, wherein:

FIG. 8 is a cross-sectional view of a variation of the lighting device.

DESCRIPTION OF EXEMPLARY EMBODIMENTS

A description will now be made below with respect to lighting devices of the presently disclosed subject matter with reference to the accompanying drawings and in accordance with exemplary embodiments.

Figure 3:
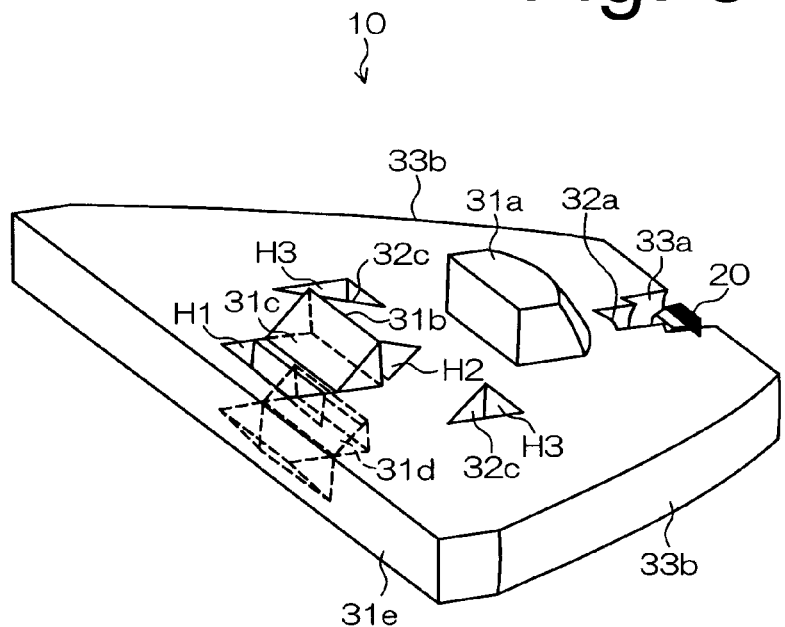
FIG. 3 is a perspective view of a lighting device made in accordance with principles of the presently disclosed subject matter, when viewed from its front surface side (from obliquely above)
Figure 4:
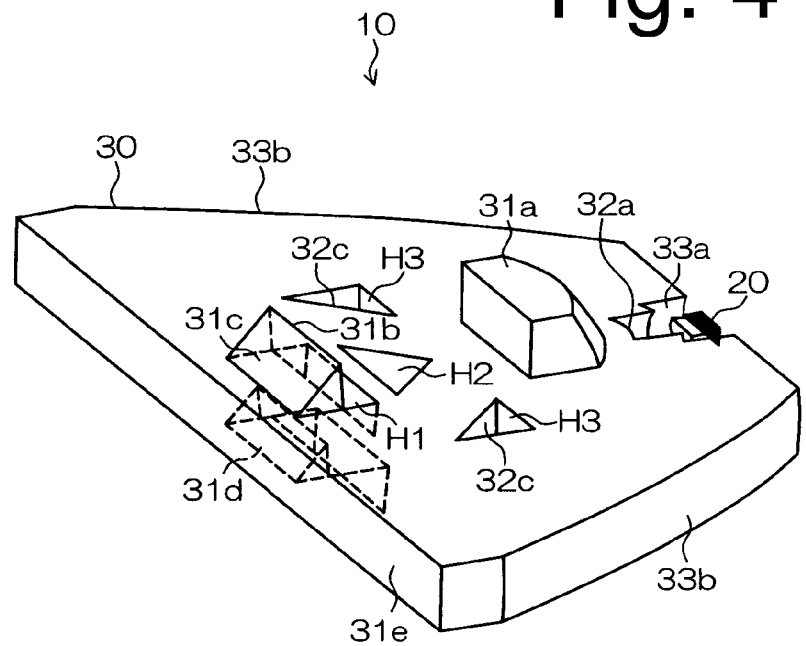
FIG. 4 is a perspective view of the lighting device when viewed from its rear surface side (from obliquely below)
Figure 5:
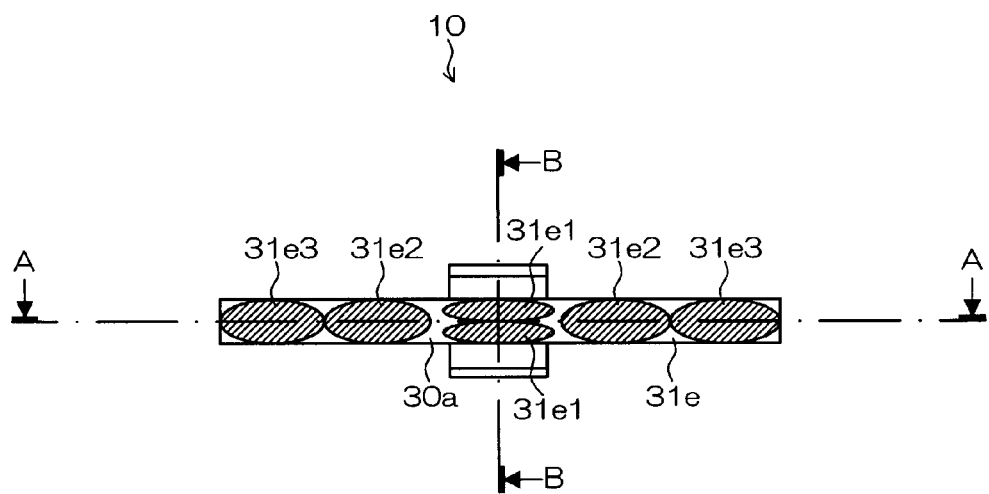
FIG. 5 is a front view of the lighting device.
Figure 6:
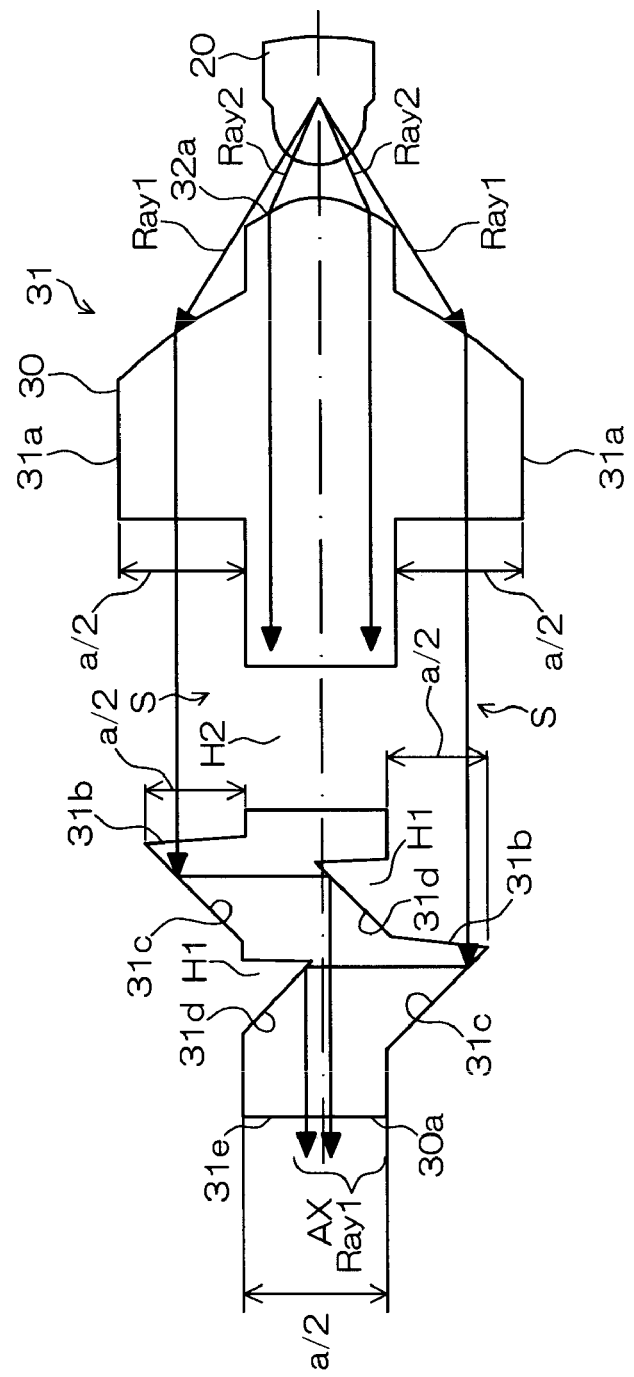
FIG. 6 is a cross-sectional view of the lighting device taken along line B-B in FIG. 5.
Figure 7:
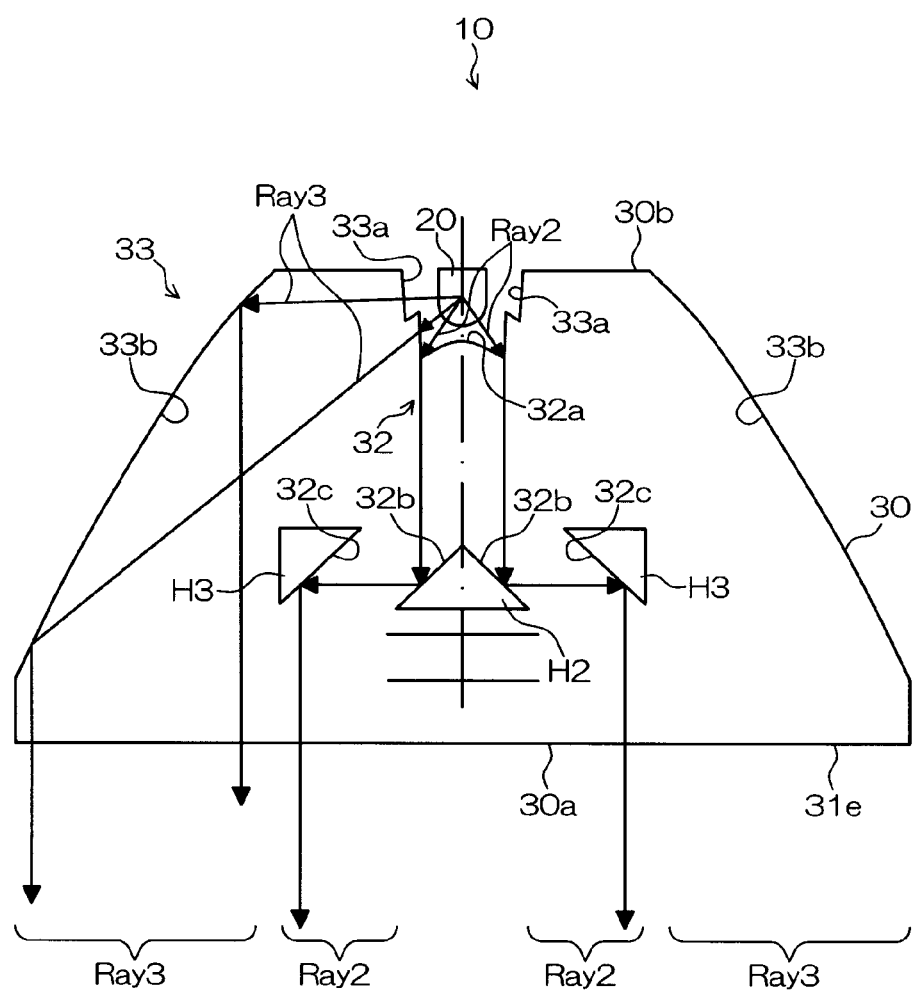
FIG. 7 is a cross-sectional view of the lighting device taken along line A-A in FIG. 5.

FIG. 3 is a perspective view of a lighting device 10 made in accordance with principles of the presently disclosed subject matter, when viewed from its front surface side (from obliquely above). FIG. 4 is a perspective view of the lighting device 10 when viewed from its rear surface side (from obliquely below). FIG. 5 is a front view of the lighting device 10. FIG. 6 is a cross-sectional view of the lighting device 10 taken along line B-B in FIG. 5. FIG. 7 is a cross-sectional view of the lighting device 10 taken along line A-A in FIG. 5.

The lighting device 10 of the present exemplary embodiment can be applied to vehicular signal lamps (tail lamps, stop lamps, turn signal lamps, day-time running lamps, position lamps, and the like) or general purpose illumination lamps. As shown in FIGS. 3 and 4, the lighting device 10 of the present exemplary embodiment can include an LED light source 20, a lens body 30, and the like.

The LED light source 20 can be an LED including at least one LED chip (for example, blue LED chip) and a fluorescent material (for example, yellow fluorescent material). The LED light source 20 can emit white light (pseudo white light) including the light having been emitted from the LED chip that has passed through the fluorescent material in combination with light having been generated by the excitation of the fluorescent material by the light from the LED chip. When the lighting unit 10 of the present exemplary embodiment is used for a stop lamp, an LED light source including a red LED chip that can emit at least red light can be used as the LED light source 20.

As shown in FIG. 6, the LED light source 20 can be disposed to face to the side surface of the lens body 30 so that light Ray1 travelling in the thickness direction of the lens body 30 out of light radially emitted from the LED light source 20 in a wide angle direction with respect to the optical axis AX is directed to the front surface and the rear surface of the lens body 30. In addition, light Ray 2 radially emitted from the LED light source 20 in a narrow angle direction with respect to the optical axis AX can impinge on the side surface of the lens body 30 to enter the lens body 30.

As shown in FIGS. 6 and 7, the lens body 30 can be formed from a transparent resin (such as acrylic resins or polycarbonate resins) or a glass material. The lens body 30 can be a plate-like lens body with a thickness of "a", and can be configured to include a first optical system 31, a second optical system 32, a third optical system 33, a first side surface 30a with a width dimension longer than a thickness dimension and serving as an elongated rectangular light exiting surface 31e (see FIGS. 5 and 7), and a second side surface 30b opposite to the first side surface 30a (see FIG. 7).

As shown in FIG. 6, the first optical system 31 can include: a lens portion 31a, a first light incident surface 31b, a first total reflection surface 31c, and a second total reflection surface 31d. The lens portion 31a can be formed on the front surface and the rear surface of the lens body 30 so as to allow the light Ray1 toward the front surface and the rear surface of the lens body 30 to impinge thereon. The light incident surface thereof can be directed to the LED light source 20. The lens portion 31a can gather the light Ray1 near the optical axis AX, specifically, to be substantially parallel to the optical axis AX. The height dimension of the lens portion 31a is represented by a/2. The first light incident surface 31b can be disposed on an optical path of the light Ray1 gathered by the lens portion 31a, and configured to cause the light Ray1 to enter the lens portion 30 again. The first total reflection surface 31c can be disposed on an optical path of the light Ray1 entering the lens body 30 through the first light incident surface 31b, and configured to totally reflect the light Ray1 in a direction orthogonal to the optical axis AX. The second total reflection surface 31d can be disposed on an optical path of the light Ray1 totally reflected by the first total reflection surface 31c, and configured to totally reflect the light Ray1 to project the light Ray1 substantially parallel to the optical axis AX from an approximately center area 31e1 of the light exiting surface 31e (see FIG. 5). In addition, an air layer S (being a space) configured to cause the light Ray1 gathered by the lens portion 31a and travelling parallel to the optical axis AX to pass therethrough can be provided between the lens portion 31a and the first light incident surface 31b.

The first light incident surface 31b can be configured to have a lens surface substantially perpendicular to the light Ray1 (in the travelling direction) so as not to reflect the light Ray1 off the surface thereof. The lens surface can have a height dimension of a/2. In the present exemplary embodiment, the second total reflection surface 31d can be a recessed portion H1 (or a part thereof) formed in the rear surface (or the front surface) corresponding to the front surface (or the rear surface) where the lens portion 31a is formed.

In the first optical system 31 with the above configuration, as shown in FIG. 6, the light Ray1 directed toward the front surface and the rear surface of the lens body 30 out of the light radially emitted from the LED light source 20 can be gathered by the action of the lens portion 31a to be made substantially parallel to the optical axis AX and pass through the air layer S (being a space) defined between the lens portion 31a and the first light incident surface 31b. Then, the light Ray1 can enter the lens body 30 again, and travel in the lens body 30. The light Ray1 can be totally reflected by the actions of the first total reflection surface 31c and the second total reflection surface 31d, namely twice in total, and exit the lens body 30 from its substantial center area 31e1 of the light exiting surface 31e as parallel light with respect to the optical axis AX (see FIG. 5).

As shown in FIG. 7, the second optical system 32 can include a second light incident surface 32a, third total reflection surface 32b, and a fourth total reflection surface 32c. The second light incident surface 32a can be disposed in the side surface (the second side surface 30b) of the lens body 30 facing to the LED light source 20. The second light incident surface 32a can be configured to gather, toward the optical axis AX (in the present exemplary embodiment, to be substantially parallel to the optical axis AX), the light Ray2 radially emitted from the LED light source 20 in the narrow angle direction with respect to the optical axis AX. In the present exemplary embodiment, the light Ray2 may be light with a higher directivity of 20 degrees with respect to the center of the LED light source 20. The third total reflection surface 32b can be disposed on an optical path of the light Ray2 entering the lens body 30 by being gathered by the second light incident surface 32a, and configured to totally reflect the light Ray2 sideward with respect to the optical axis AX. The fourth total reflection surface 32c can be disposed on an optical path of the light Ray2 totally reflected by the third total reflection surface 32b. The fourth total reflection surface 32c can be configured to totally reflect the light Ray2 to project the light Ray2 substantially parallel to the optical axis AX from a side area 31e2 adjacent to the center area 31e1 of the first side surface as the light exiting surface 31e (see FIG. 5).

In the present exemplary embodiment, the third total reflection surface 32b can be configured as a through hole H2 penetrating the lens body 30 from the front surface to the rear surface. In particular, in the present exemplary embodiment, it can be a part of the through hole H2 that is an inclined surface by 45 degrees with respect to the optical axis AX. Furthermore, the fourth total reflection surface 32c can be configured as a through hole H3 penetrating the lens body 30 from the front surface to the rear surface beside the through hole H2. In particular, in the present exemplary embodiment, it can be a part of the through hole H3 that is an inclined surface by 45 degrees with respect to the optical axis AX.

In the second optical system 32 with the above configuration, as shown in FIG. 7, the light Ray2 radially emitted from the LED light source 20 in a narrow angle direction with respect to the optical axis AX can be gathered by the action of the second light incident surface 32a to be made substantially parallel to the optical axis AX and travel in the lens body 30. Then the light Ray2 can be totally reflected by the actions of the third total reflection surface 32b and the fourth total reflection surface 32c, namely twice in total, and exit the lens body 30 from the side area 31e2 adjacent to the center area 31e1 of the light exiting surface 31e as parallel light with respect to the optical axis AX (see FIG. 5).

As shown in FIG. 7, the third optical system 33 can include a third light incident surface 33a configured to cause the light in the width direction of the lens body out of the light Ray3 radially emitted from the LED light source 20 in the wide angle direction with respect to the optical axis AX to enter the lens body 30; and a fifth total reflection surface 33b configured to totally reflect the light Ray3 entering the lens body 30 through the third light incident surface 33a so as to project the light Ray3 substantially parallel to the optical axis AX from an outer area 31e3 adjacent to the side area 31e2 of the light exiting surface 31e (see FIG. 3).

A rear part of the third light incident surface 33a can be a wall-shape lens surface (or a cylindrical lens surface) extending, for example, from the front part of the periphery of the third light incident surface 33a to the portion near the LED light source 20.

The fifth total reflection surface 33b can be a total reflection surface of a revolved parabola having a focal point at or near (i.e., substantially at) the crossing point between a group of light Ray3 refracted by the light incident surface 33a to enter the lens body 30. In the present exemplary embodiment, the side surface of the lens body 30 can serve as the fifth total reflection surface 33b.

In the third optical system 33 with the above configuration, as shown in FIG. 7, the light Ray3 radially emitted from the LED light source 20 in a wide angle direction with respect to the optical axis AX can enter the lens body 30 from the light incident surface 33a and travel in the lens body 30. Then the light Ray2 can be totally reflected by the action of the fifth total reflection surface 33b, and exit the lens body 30 from the outer area 31e3 adjacent to the side area 31e2 of the light exiting surface 31e as parallel light with respect to the optical axis AX (see FIG. 5).

As illustrated above, in the above lighting device 10 of the present exemplary embodiment, the action of the lens body 30 (including the respective optical systems 31 to 33) can constitute the line-shaped light source configured to radiate light from the light exiting surface 31e (including the center areas 31e1, the side areas 31e2 and the outer areas 31e3) in a line shape.

Figure 1:
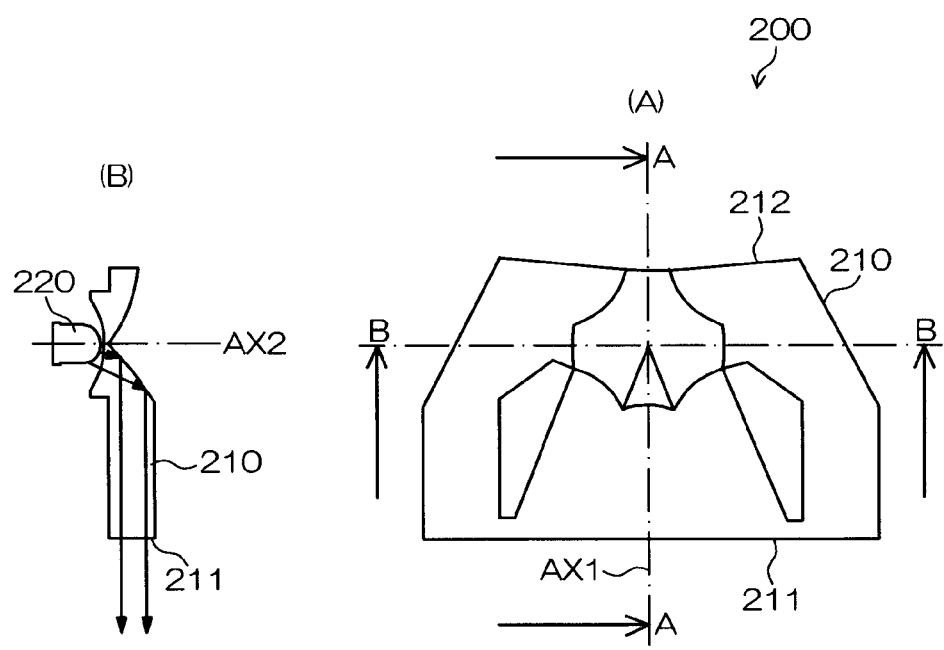
FIGS. 1A, 1B, and 1C are a plan view of a conventional lighting device, a cross-sectional view thereof taken along line A-A in FIG. 1A, and a cross-sectional view thereof taken along line B-B in FIG. 1A, respectively.
Figure 2:
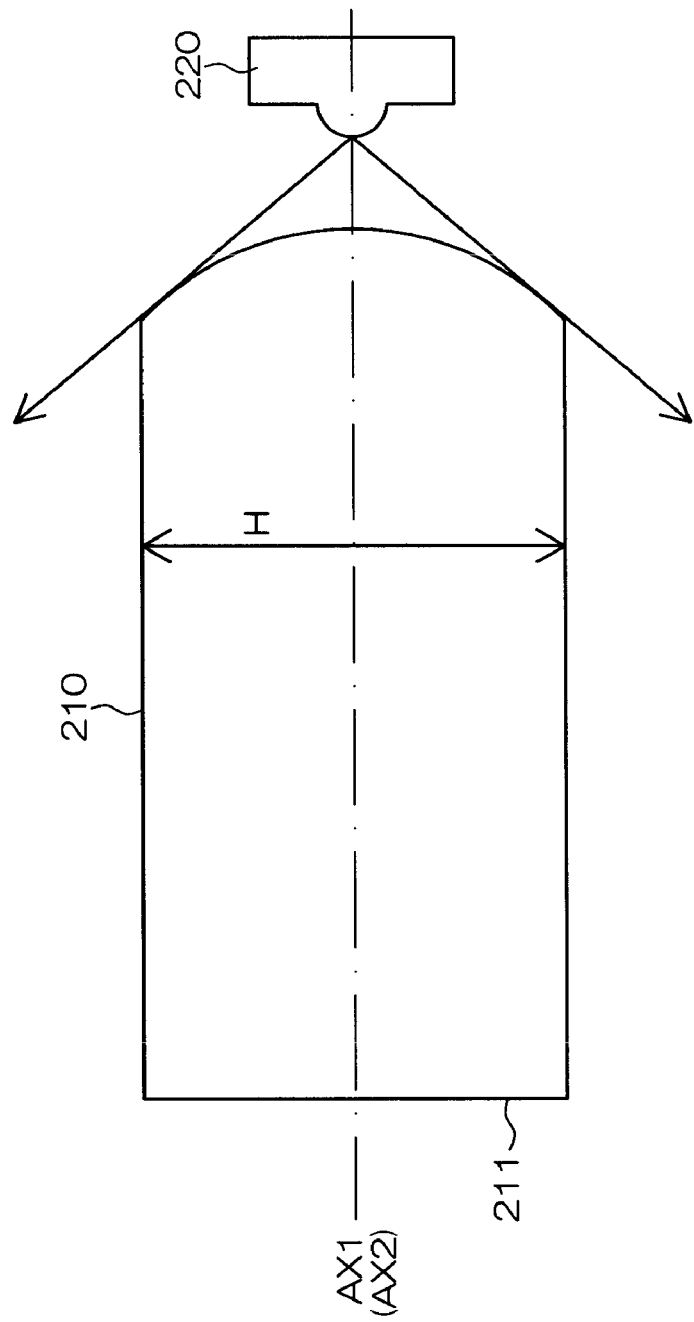
FIG. 2 is a plan view illustrating another conventional lighting device.

Further, in the present exemplary embodiment, even if the amount of light Ray1 directed to the front surface and the rear surface of the lens body 30 (see FIG. 2) is increased by the thinning of the lens body thickness, the light Ray1 directed to the front surface and the rear surface of the lens body 30 can be caused to enter the lens body 30 again by the action of the first optical system 31 (such as the lens portion 31a). Accordingly, the light utilization efficiency can be prevented from being lowered due to the thinning of the lens body thickness. Thus, according to the present exemplary embodiment, it is possible to provide the lighting device 10 that can utilize the lens body 30 having a thickness that is thinner than the thickness of the above described conventional light device, and can achieve the light utilization efficiency equal to or higher than that of the conventional light device.

In the present exemplary embodiment, since the air layer S (space) is formed between the lens portion 31a and the light incident surface 31b (see FIG. 6), the lens body 30 can be reduced in thickness by the amount corresponding to the air layer and can thus be made more lightweight (and can benefit from characteristics of weight saving).

In the present exemplary embodiment, the line-shaped light source configured to radiate light Ray1 to Ray 3 substantially parallel to the optical axis AX can be provided (see FIGS. 6 and 7).

Further, in the present exemplary embodiment, the respective optical elements including the lens portion 31a, the respective light incident surfaces 31b, 32a and 33a and the respective total reflection surfaces 31c, 31d, 32b, 32c, and 33b can be adjusted to configure the line-shaped light source having uniform brightness.

In the present exemplary embodiment, the first to fifth total reflection surfaces 31c, 31d, 32b, 32c, and 33b can reflect with 100% reflectance and, accordingly, the light utilization efficiency can be further improved when compared with the case of a reflection surface subjected to mirror finishing such as aluminum deposition.

In the present exemplary embodiment, since the optical axis AX of the LED light source 20 coincides with the optical axis of the lens body 30, the layout can be facilitated.

A description will next be given of a modification.

In the above exemplary embodiment, the respective optical elements including the lens portion 31a, the respective light incident surfaces 31b, 32a and 33a and the respective total reflection surfaces 31c, 31d, 32b, 32c, and 33b are formed in the front surface and the rear surface of the lens body 30. However, the presently disclosed subject matter is not limited thereto.

As shown in FIG. 6, the respective optical elements including the lens portion 31a, the respective light incident surfaces 31b, 32a and 33a and the respective total reflection surfaces 31c, 31d, 32b, 32c, and 33b can be formed in any one of the front surface and the rear surface of the lens body 30. In this case, the height dimension of the lens portion 31a and that of the light incident surface 31b can be equal to the lens body 30 or the thickness "a" in one mode. By doing so, the same or similar advantageous effects can be provided.

In the above exemplary embodiment and modification, the lens body 30 includes the third optical system 33, but the presently disclosed subject matter is not limited thereto. For example, the lens body 30 can include only the first and second optical systems 31 and 32. In this case, the lens body 30 (including the optical systems 31 and 32) can constitute the line-shaped light source configured to radiate light from the light exiting surface 31e (the center area 31e1 and the side areas 31e2) in a line shape.

In the above exemplary embodiment and modification, the third optical system 33 is composed of the light incident surface 33a and the fifth total reflection surface 33b. However, the presently disclosed subject matter is not limited thereto. Alternatively, the third optical system 33 can be an optical system having optical elements with refractive or reflecting action or other optical actions.

FIG. 8 shows another exemplary embodiment of a lighting device in which the overall shapes of the different components can be changed such that the first optical system includes structures (such as lens portion 31a, first light incident surface 31b, and first total reflecting surface 31c) each having a height "a", while the light exiting surface also has a height "a". It should be noted that there are no optical structures on the rear surface of the lens boy in this embodiment, and the rear surface can thus be substantially planar. Thus, the total thickness of the lens can be maintained at "2a."

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting device comprising:
an LED light source having an optical axis; and
a plate-like lens body including a front surface, a rear surface, a first side surface with a width dimension longer than a thickness dimension and serving as an elongated rectangular light exiting surface, and a second side surface opposite to the first side surface, wherein
the LED light source is disposed to face towards the second side surface of the lens body so that light travelling in a thickness direction of the lens body out of light radially emitted from the LED light source in a wide angle direction with respect to the optical axis is directed to at least one of the front surface and the rear surface of the lens body and so that light radially emitted from the LED light source in a narrow angle direction with respect to the optical axis impinges on the second side surface of the lens body to enter the lens body;
the lens body includes at least a first optical system and a second optical system,
the first optical system including
a lens portion formed on at least one of the front surface and the rear surface of the lens body and configured to allow light directed toward the at least one of the front surface and the rear surface of the lens body to impinge thereon to gather the light near the optical axis,
a first light incident surface disposed on an optical path of the light gathered by the lens portion, the first light incident surface configured to cause the light to enter the lens body again,
a first total reflection surface disposed on an optical path of the light entering the lens body through the first light incident surface, the first total reflection surface configured to totally reflect the light into a direction substantially orthogonal to the optical axis, and
a second total reflection surface disposed on an optical path of the light that is totally reflected by the first total reflection surface, the second total reflection surface configured to totally reflect the light to project the light substantially parallel with the optical axis and from an approximately center area of the first side surface as the light exiting surface;

the second optical system including
- a second light incident surface disposed in the second side surface of the lens body facing towards the LED light source, the second light incident surface configured to gather, toward the optical axis, the light radially emitted from the light source in the narrow angle direction with respect to the optical axis,
- a third total reflection surface disposed on an optical path of the light entering the lens body after being gathered by the second light incident surface, the third total reflection surface configured to totally reflect the light sideward with respect to the optical axis, and
- a fourth total reflection surface disposed on an optical path of the light that is totally reflected by the third total reflection surface, the fourth total reflection surface configured to totally reflect the light to project the light substantially parallel with the optical axis from a side area adjacent to the approximately center area of the first side surface as the light exiting surface; and
- an air layer located between the lens portion and the first light incident surface and configured to allow the light gathered by the lens portion to pass therethrough.

2. The lighting device according to claim 1, wherein the lens body further includes a third optical system, the third optical system including
- a third light incident surface configured to cause the light emitted from the LED light source in the width direction of the lens body out of the light radially emitted from the LED light source in the wide angle direction with respect to the optical axis to enter the lens body, and
- a fifth total reflection surface configured to totally reflect the light entering the lens body through the third light incident surface so as to project the light substantially parallel with the optical axis from an outer area adjacent to the side area of the first side surface as the light exiting surface.

3. The lighting device according to claim 1, wherein the lens body includes an acrylic resin.

4. The lighting device according to claim 1, wherein the lens body consists of a one piece transparent material.

5. The lighting device according to claim 1, wherein the LED light source includes an LED chip configured to emit red light.

6. The lighting device according to claim 1, wherein the LED light source includes an LED chip configured to emit blue light.

7. The lighting device according to claim 6, wherein the LED light source includes a wavelength conversion material configured to cause white light to be emitted from the LED light source due to color combination.

8. A lighting device comprising:
a light source configured to emit light along an optical axis; and
a lens body including a front surface, a rear surface, a first side surface with a width dimension longer than a thickness dimension and serving as an elongated light exiting surface, and a second side surface opposite to the first side surface, wherein
the light source is disposed to face towards the second side surface of the lens body so that a first portion of light emitted from the light source is directed to at least one of the front surface and the rear surface of the lens body and so that a second portion of light emitted from the light source impinges on the second side surface of the lens body to enter the lens body,
the lens body includes at least a first optical system and a second optical system, the first optical system including
- a lens portion formed on at least one of the front surface and the rear surface of the lens body and configured to allow the first portion of light to impinge thereon and to direct the first portion of light to be substantially parallel with the optical axis,
- a first light incident surface disposed on an optical path of the first portion of light after the first portion of light has been directed to be substantially parallel with the optical axis by the lens portion, the first light incident surface configured to cause the first portion of light to enter the lens body again,
- a first total reflection surface disposed on an optical path of the first portion of light that has entered the lens body through the first light incident surface, the first total reflection surface configured to totally reflect the first portion of light into a direction substantially orthogonal to the optical axis, and
- a second total reflection surface disposed on an optical path of the first portion of light that is totally reflected by the first total reflection surface, the second total reflection surface configured to totally reflect the first portion of light to project the first portion of light substantially parallel with the optical axis and from an approximately center area of the first side surface;

the second optical system including
- a second light incident surface disposed in the second side surface of the lens body facing towards the light source, the second light incident surface configured to gather, toward the optical axis, a second portion of light emitted from the light source,
- a third total reflection surface disposed on an optical path of the second portion of light after being gathered by the second light incident surface, the third total reflection surface configured to totally reflect the second portion of light sideward with respect to the optical axis, and
- a fourth total reflection surface disposed on an optical path of the second portion of light after being totally reflected by the third total reflection surface, the fourth total reflection surface configured to totally reflect the second portion of light to project the second portion of light substantially parallel with the optical axis from a side area adjacent to the approximately center area of the first side surface; and
- an air layer located between the lens portion and the first light incident surface and configured to allow the first portion of light to pass therethrough.

9. The lighting device according to claim 8, wherein the lens body further includes a third optical system, the third optical system including
- a third light incident surface configured to cause a third portion of light emitted from the light source to enter the lens body, and
- a fifth total reflection surface configured to totally reflect the third portion of light so as to project the third portion of light substantially parallel with the optical axis from an outer area adjacent to the side area of the first side surface.

10. The lighting device according to claim 8, wherein the lens body includes an acrylic resin.

11. The lighting device according to claim 8, wherein the lens body consists of a one piece transparent material.

12. The lighting device according to claim 8, wherein the light source includes an LED chip configured to emit red light.

13. The lighting device according to claim 8, wherein the light source includes an LED chip configured to emit blue light.

14. The lighting device according to claim 13, wherein the light source includes a wavelength conversion material configured to cause white light to be emitted from the light source due to color combination.

15. The lighting device according to claim 8, wherein the lens body includes a light emission surface located between the lens portion and the first light incident surface.

16. The lighting device according to claim 15, wherein the lens body includes an air layer located between the light emission surface and the first light incident surface.

17. The lighting device according to claim 8, wherein the rear surface of the lens body is substantially planar.

18. The lighting device according to claim 1, wherein the rear surface of the lens body is substantially planar.

* * * * *